United States Patent
Lung et al.

(10) Patent No.: US 6,264,408 B1
(45) Date of Patent: Jul. 24, 2001

(54) PNEUMATIC TOOL KIT

(76) Inventors: Hui Ping Lung, 5F-11, No. 50, Sec. 2, Li Ming Rd.; Shu Yi Yang, No. 6, Wu Chuan Rd., both of Taichung (TW)

( * ) Notice: Subject to any disclaimer, the term of this patent is extended or adjusted under 35 U.S.C. 154(b) by 0 days.

(21) Appl. No.: 09/505,835

(22) Filed: Feb. 17, 2000

(51) Int. Cl.$^7$ ........................................... B23C 1/20
(52) U.S. Cl. ..................... 409/182; 279/157; 408/113; 408/124; 408/702; 409/218; 451/295; 451/359
(58) Field of Search ..................... 279/157; 408/124, 408/110, 113, 114, 241 S, 702; 409/181, 182, 134, 138, 218; 451/295, 358, 359, 344

(56) References Cited

U.S. PATENT DOCUMENTS

| | | | |
|---|---|---|---|
| 3,875,703 | * | 4/1975 | Clemete ............................ 51/170 T |
| 3,916,586 | * | 11/1975 | Rivas .................................. 51/368 |
| 4,290,464 | * | 9/1981 | Marsan ........................... 144/136 C |
| 4,558,539 | * | 12/1985 | Hansson .......................... 51/170 R |
| 4,674,548 | * | 6/1987 | Mills et al. ...................... 409/182 |
| 4,764,060 | * | 8/1988 | Khurana ........................... 408/113 |
| 4,891,915 | * | 1/1990 | Yasuda ............................ 51/170 T |
| 5,020,280 | * | 6/1991 | O'Reilly ........................... 51/168 |
| 5,218,790 | * | 6/1993 | Huang ............................. 51/170 T |
| 5,259,914 | * | 11/1993 | Fisher ............................... 156/584 |
| 5,775,981 | * | 7/1998 | Yang ............................... 451/295 |
| 5,784,789 | * | 7/1998 | Vargas ............................. 409/182 |
| 5,879,228 | * | 3/1999 | Sun .................................. 451/357 |
| 5,941,764 | * | 8/1999 | Yang ............................... 451/358 |
| 6,000,888 | * | 12/1999 | Hartman ........................ 408/239 R |

FOREIGN PATENT DOCUMENTS

| | | | |
|---|---|---|---|
| 2031764 | * | 6/1932 | (GB) ............................ 408/239 R |
| 552110 | * | 6/1932 | (DE) ............................. 408/241 S |

* cited by examiner

Primary Examiner—A. L. Wellington
Assistant Examiner—Monica S. Carter
(74) Attorney, Agent, or Firm—Rosenberg, Klein & Lee (57) ABSTRACT

A pneumatic tool kit including a main body, a threaded plug, a connecting seat, at least one grinding member, a protective cover, a saw disk seat, an adjustment seat, at least one edge-milling tool, a stopper board and at least one drilling/milling tool. By means of the tool hole of the main body and the connecting seat, four different kinds of tools can be respectively installed on the main body for four different usages including engraving, cutting, edge-milling and drilling. Therefore, the main body is usable for four kinds of usages so that the manufacturing cost for the tool is lowered. In addition, by means of the pneumatic motor of the main body, the tool kit has longer and more stable using life.

2 Claims, 8 Drawing Sheets

//PNEUMATIC TOOL KIT

BACKGROUND OF THE INVENTION

The present invention relates to a pneumatic tool kit in which the main body is able to couple with four kinds of tools.

Figure 7:
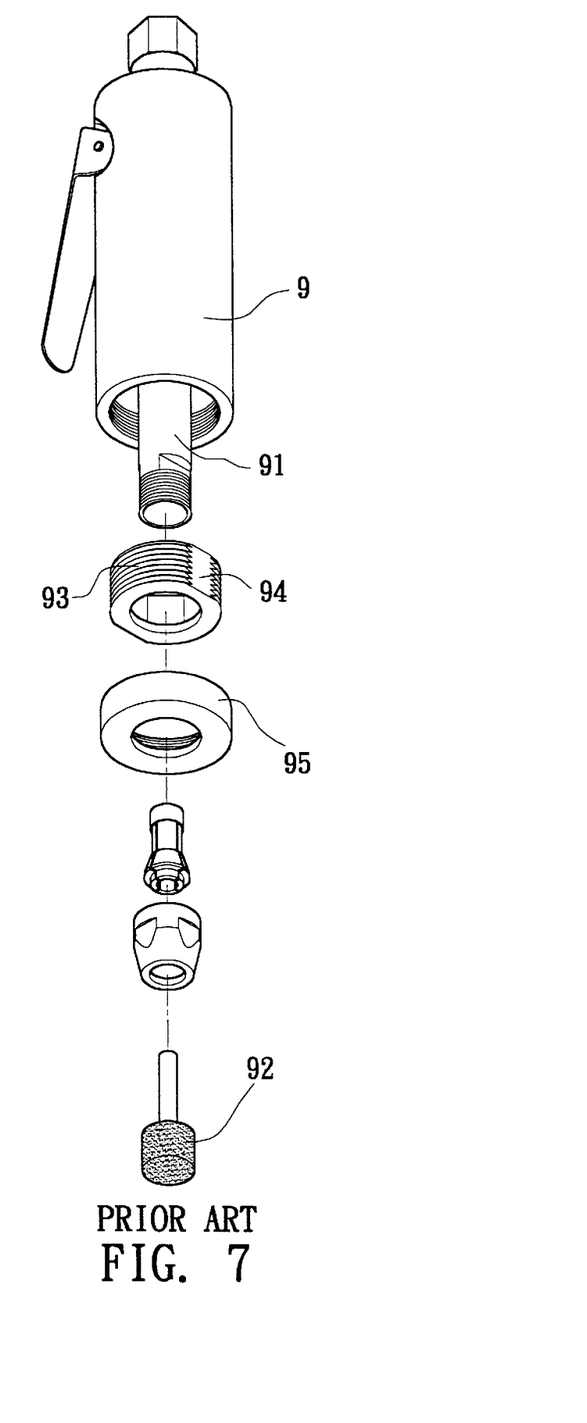
FIG. 7 is a perspective exploded view of a conventional pneumatic tool.
Figure 8:
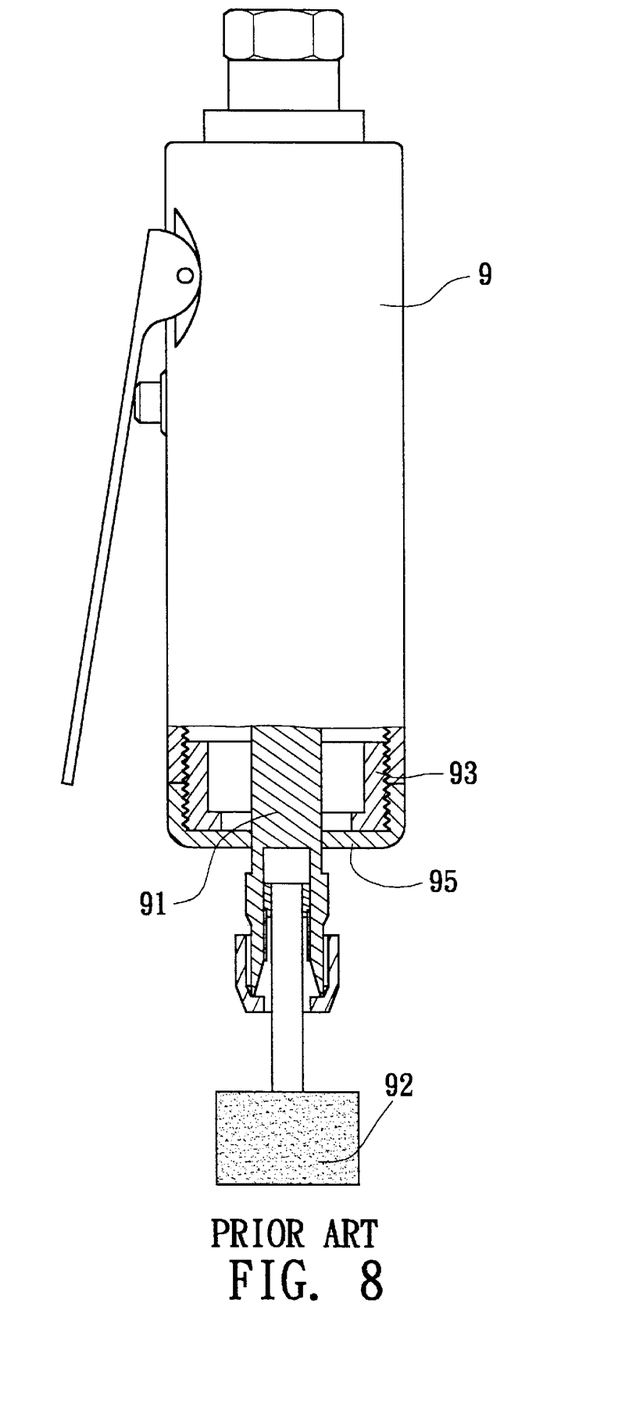
FIG. 8 is a sectional assembled view of the conventional pneumatic tool.

FIGS. 7 and 8 show a conventional pneumatic tool. A motor (not shown) is installed on a main body 9. A shaft of the motor 91 downward extends to couple with a grinding member 92. A threaded plug 93 is screwed into the main body 9 to fix the motor in the main body. The threaded plug 93 has two plane faces as driving sections 94. A free end of the threaded plug 93 is locked with a decorative ring 95. The grinding member 92 is driven by the motor to grind a work piece.

In comparison with an electric tool, the pneumatic tool must be equipped with an air compressor (not shown). The motor of the electric tool is operated at very high rotational speed, while having insufficient torque. Therefore, when the electric tool cuts a work piece, the load is relatively high and no heat-radiating design is provided. As a result, the coil of the rotor of the motor tends to burn down due to over-heating and other parts tend to malfunction. Moreover, the manufacturing cost of the electric tool is relatively high. However, the existing pneumatic tool can be only used for engraving and cannot be used as other tools. Therefore, the using range of the existing pneumatic tool is limited and although the pneumatic tool has longer and more stable using life, the pneumatic tool is still not so widely used as the electric tool.

SUMMARY OF THE INVENTION

It is therefore a primary object of the present invention to provide a pneumatic tool kit in which the main body is formed with a tool hole and disposed with a connecting seat which cooperate with a grinding member, a protective cover, a saw disk seat, an adjustment seat, an edge-milling tool, a stopper board and a drilling/milling tool, whereby four different kinds of tools for different usages including engraving, cutting, edge-milling and drilling can be selectively installed on the main body. Therefore, the main body is usable for four kinds of usages so that the manufacturing cost for the tool is lowered. In addition, by means of the pneumatic motor of the main body, the tool kit has longer and more stable using life.

The present invention can be best understood through the following description and accompanying drawings wherein:

DETAILED DESCRIPTION OF THE PREFERRED EMBODIMENTS

Figure 1:
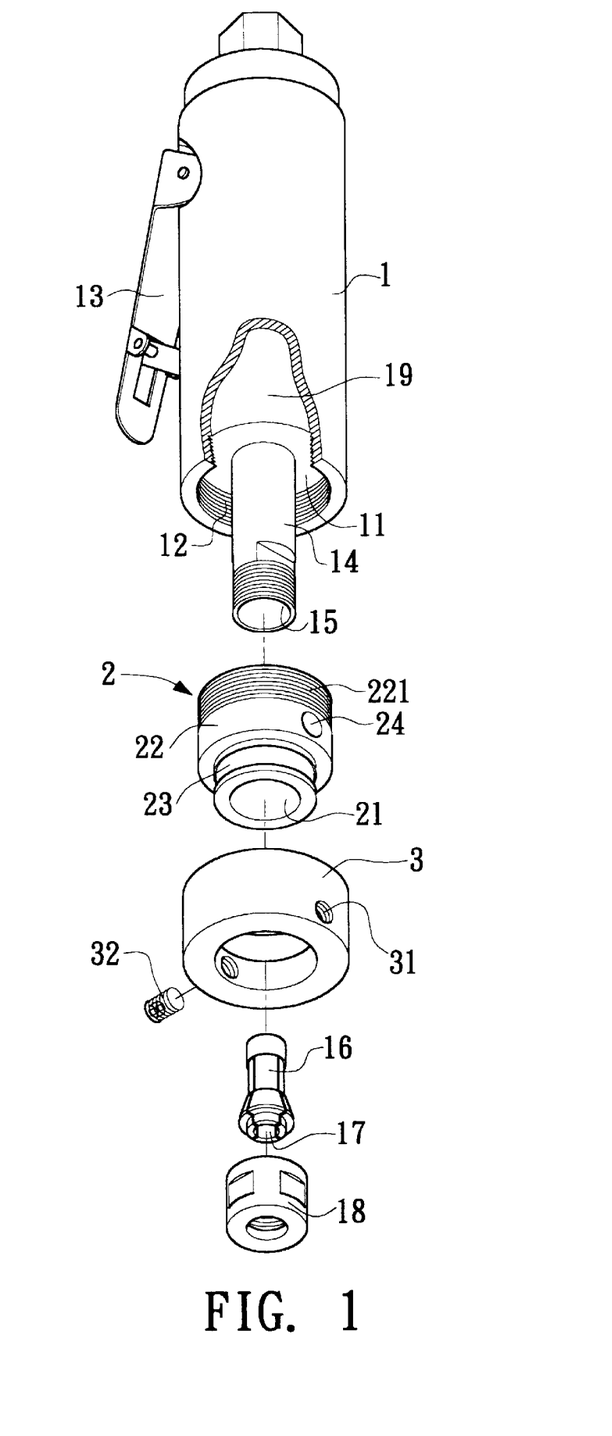
FIG. 1 is a perspective exploded view of the present invention.
Figure 2:
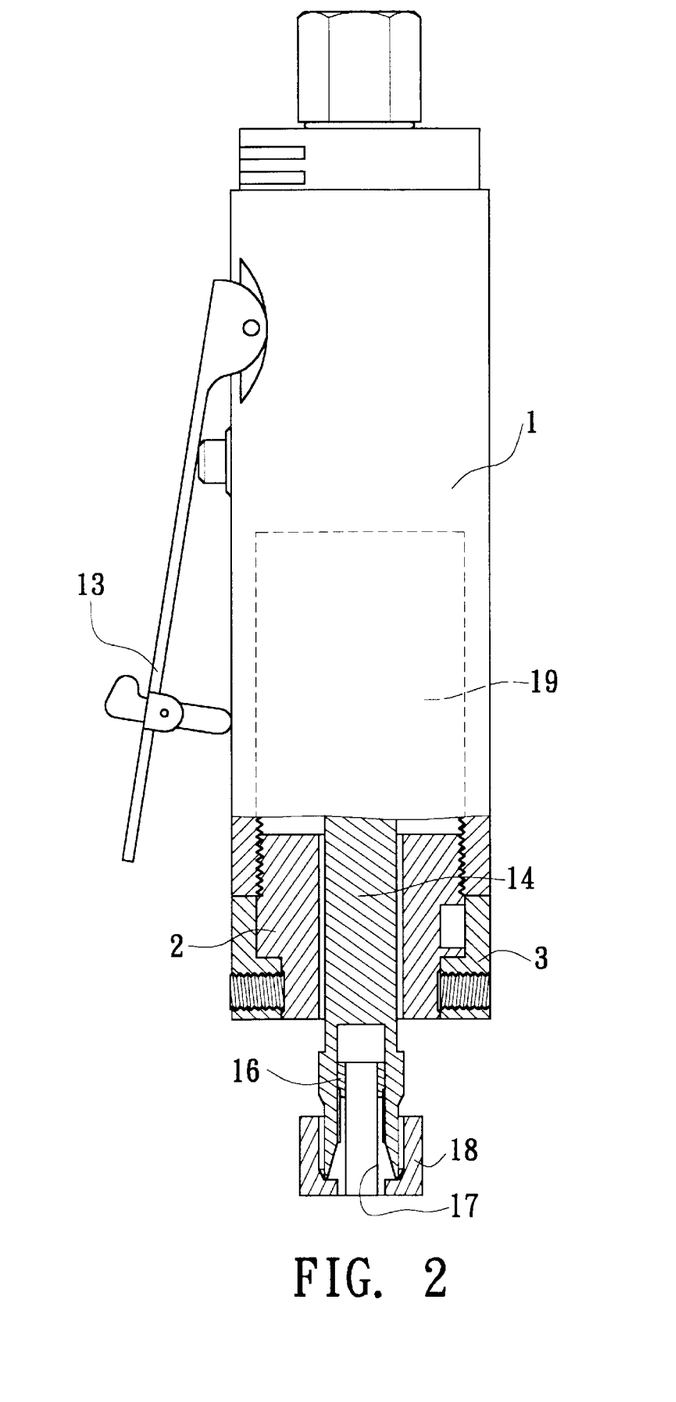
FIG. 2 is a sectional assembled view of the present invention.

Please refer to FIGS. 1 to 6. The pneumatic tool kit of the present invention includes:

a main body 1 formed with a central hole 11 in which a pneumatic motor 19 is received, the bottom wall of the hole 11 being formed with a thread section 12, a press lever 13 being pivotally connected to one side fo the main body 1 for drivingly controlling the pneumatic motor 19, in this embodiment, when pressing down the press lever 13, the pneumatic motor 19 starting to rotate, a shaft 14 of the pneumatic motor 19 downward extending out of the main body by a predetermined length, a bottom section of the shaft 14 being formed with a connecting hole 15 in which a cylindrical chuck 16 is disposed, the cylindrical chuck 16 being formed with a tool hole 17 therein, a fitting member 18 being fitted around the cylindrical chuck 16;

a threaded plug 2 formed with an axial through hole 21 for the shaft 14 of the pneumatic motor 19 to pass therethrough, the threaded plug 2 having a large diameter section 22 and a small diameter section 23, the large diameter section 22 having a thread section 221 screwed with he thread section 12 of the main body 1 to fix the pneumatic motor 19 in the main body, the threaded plug 2 having a driving section 24 which in this embodiment is a radial hole;

a connecting seat 3 fitted with the threaded plug 2, the connecting seat 3 having a fixing section 31 which in this embodiment includes two thread holes in each of which a bolt 32 is screwed;

at least one grinding member 4 selectively fitted in the tool hole 17 of the main body, a bottom section of the grinding member 4 being disposed with a sand disk 41;

a protective cover 5 having two semicircular fitting sections 51 for fitting with the connecting seat 3, the ends of the two fitting sections 51 being bolted by a bolt 52;

a saw disk seat 53 fitted in the tool hole 17 of the main body 1, the bottom of the saw disk seat 53 having two clamping plates 54 between which a saw disk 55 is sandwiched, the two clamping plates 54 and the saw disk 55 being tightened by a bolt 56;

an adjustment seat 6 having a fitting section 61 for fitting with the connecting seat 3, the fitting section 61 having a longitudinal slot 62, the bolt 32 of the connecting seat 3 being passed through the slot 62 to fix the adjustment seat 6 on the connecting seat 3, the adjustment seat 6 having an engaging section 63 with a larger diameter, the bottom end of the engaging section 63 being an engaging face 631 for abutting against a work piece (not shown);

at least one edge-milling tool 64 selectively fitted in the tool hole 17 of the main body 1, the bottom section of the edge-milling tool 64 having a blade 65 with a predetermined shape which in this embodiment is conic;

a stopper board 7 having a fitting section 71 for fitting with the connecting seat 3, the fitting section 71 having a longitudinal slot 72, the bolt 32 of the connecting seat 3 being passed through the slot 72 to fix the stopper board 7 on the connecting seat 3, the stopper board 7 having an annular section 73 with larger diameter, the bottom end of the annular section 73 being an engaging face 731 for abutting against a work piece; and at least one drilling/milling tool 74 selectively fitted in the tool hole 17 of the main body 1.

Figure 3:
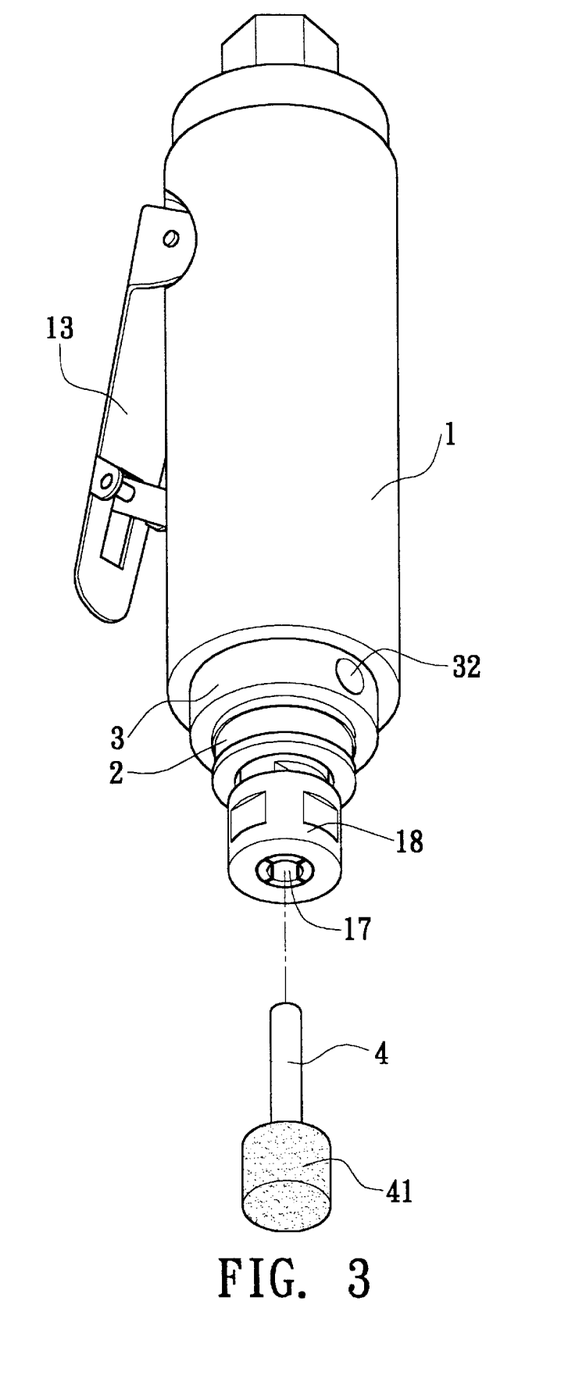
FIG. 3 is a perspective exploded view of the present invention for use of engraving.

FIG. 3 shows a first embodiment of the present invention, in which the grinding member 4 is installed on the main body 1. When the pneumatic motor rotates, the grinding member 4 is driven and the sand disk 41 of the grinding member 4 starts to grind a work piece.

Figure 4:
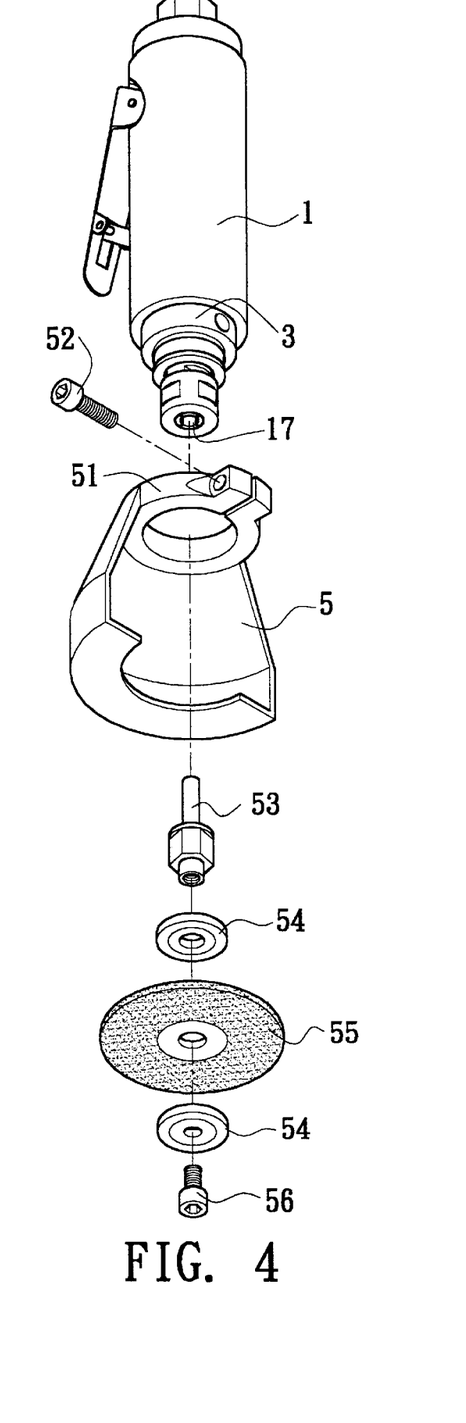
FIG. 4 is a perspective exploded view of the present invention for use of cutting.

FIG. 4 shows a second embodiment of the present invention, in which the protective cover 5 and the saw disk seat 53 are installed on the main body 1. The work piece can be cut off by the saw disk 55. The bolt 52 of the protective cover 5 serves to adjust the angle of the protective cover 5 connecting with the connecting seat 3.

Figure 5:
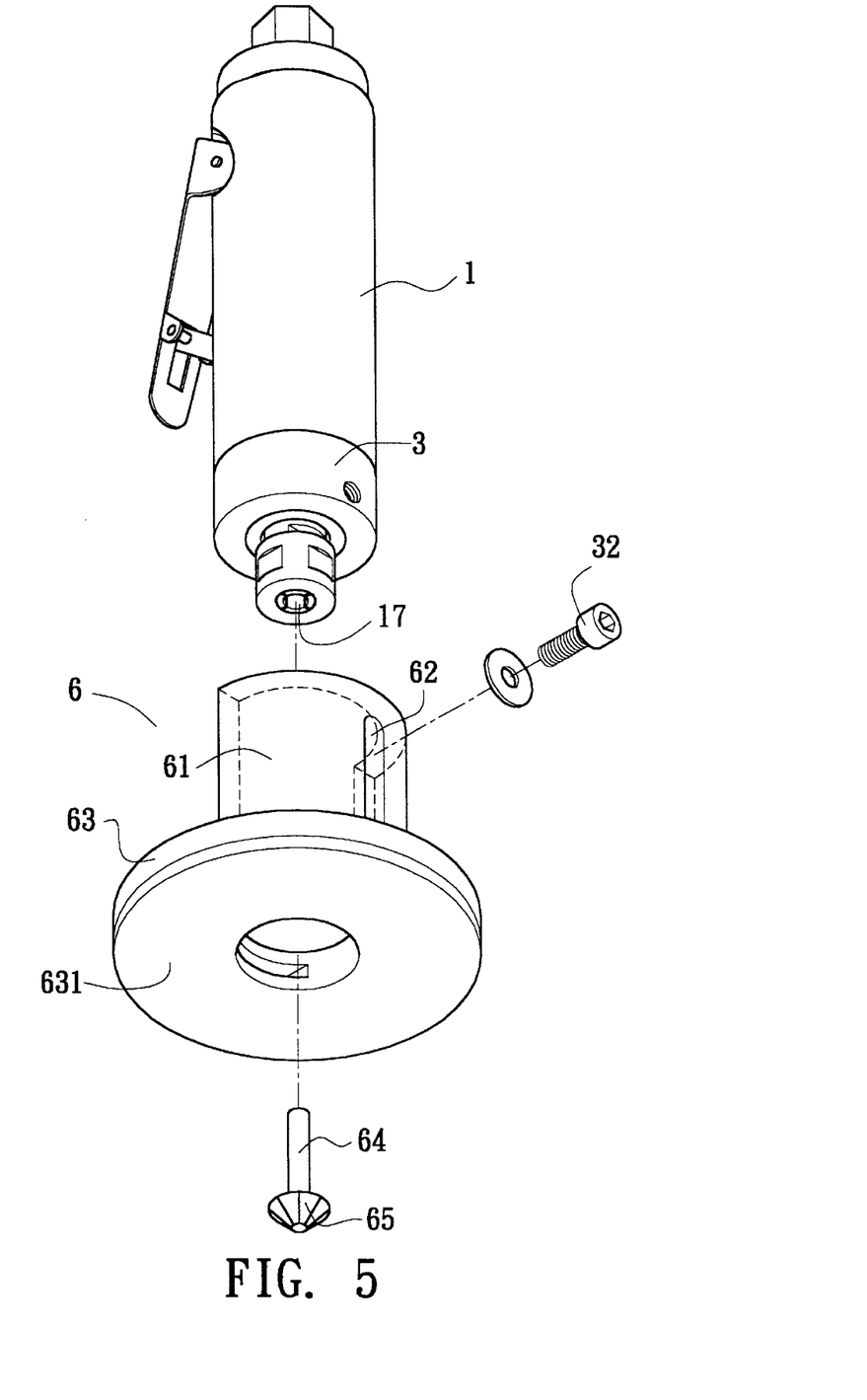
FIG. 5 is a perspective exploded view of the present invention for use of edge-milling.

FIG. 5 shows a third embodiment of the present invention, in which the adjustment seat 6 and the edge-milling tool 64 are installed on the main body 1. The engaging face 631 of the adjustment seat 6 is leant against the work piece and the blade 65 of the edge-milling tool 64 serves to mill the edge of the work piece into a predetermined shape. By means of the slot 62 of the adjustment seat 6, the length of the edge-milling tool 64 downward protruding out of the adjustment seat 6 can be adjusted so as to adjust the relative height of the milled edge.

Figure 6:
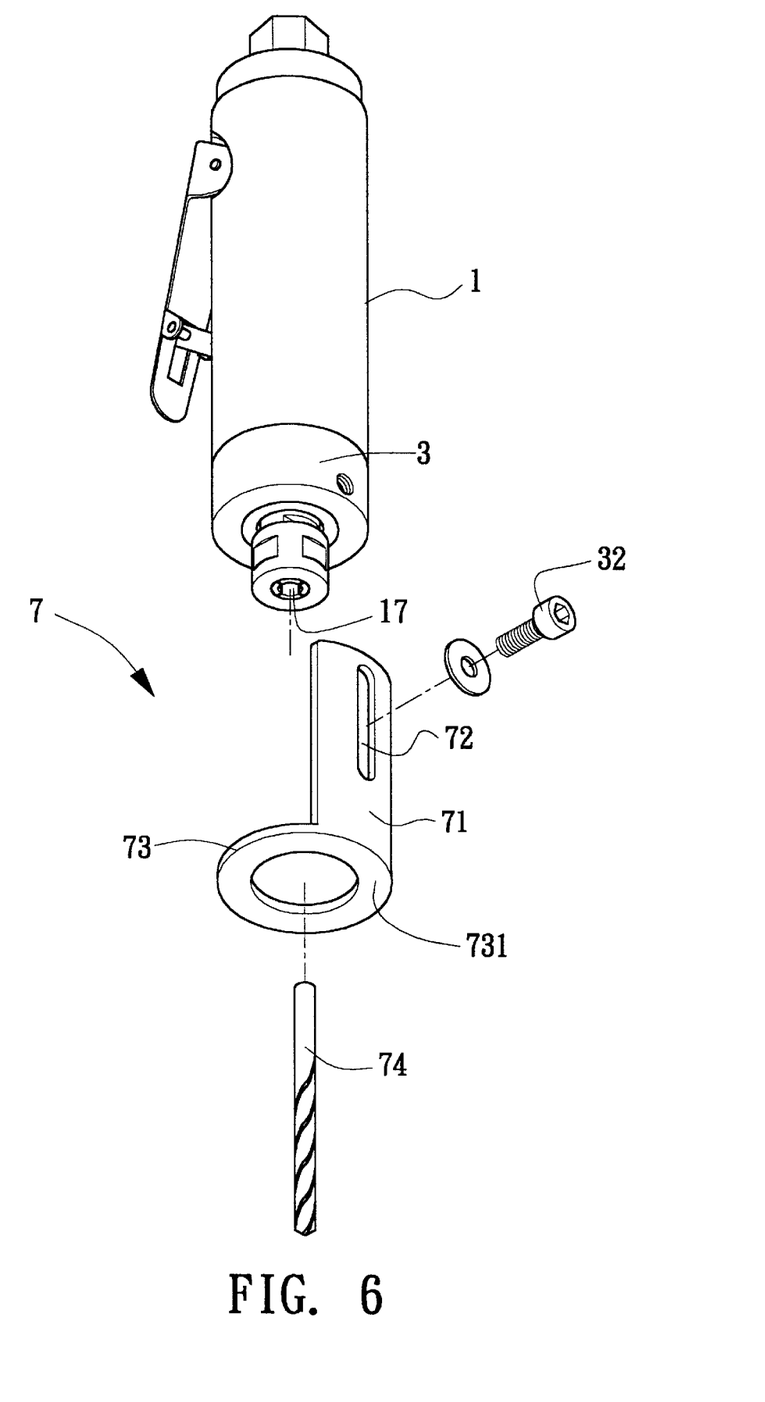
FIG. 6 is a perspective exploded view of the present invention for use of drilling.

FIG. 6 shows a fourth embodiment of the present invention, in which the stopper board 7 and the drilling/milling tool 74 are installed on the main body 1. The drilling/milling tool 74 serves to mill the work piece with a hole. When the engaging face 731 of the stopper board 7 abuts against the work piece, the depth of the drilled hole can be known. By means of the slot 72 of the stopper board 7, the length of the drilling/milling tool 74 protruding out of the stopper board 7 can be adjusted so as to adjust the depth of the drilled hole.

In conclusion, by means of the tool hole 17 of the main body 1 and the connecting seat 3, four different kinds of tools can be respectively installed on the main body 1 for four different usages including engraving, cutting, edge-milling and drilling. Therefore, the main body 1 is usable for four kinds of usages so that the manufacturing cost for the tool is lowered. In addition, by means of the pneumatic motor of the main body 1, the present invention has longer and more stable using life.

The above embodiments are only used to illustrate the present invention, not intended to limit the scope thereof. Many modifications of the above embodiments can be made without departing from the spirit of the present invention.

What is claimed is:

1. A pneumatic tool kit comprising:
   a main body formed with a central hole in which a pneumatic motor is received, a bottom wall of the hole being formed with a thread section, a press lever being pivotally connected to one side of the main body for drivingly controlling the pneumatic motor, a shaft of the pneumatic motor having a predetermined length extending downwardly out of the main body, a bottom section of the shaft being formed with a connecting hole in which a cylindrical chuck is disposed, the cylindrical chuck being formed with a tool hole therein, a fitting member being fitted around the cylindrical chuck;
   a threaded plug formed with an axial through hole for the shaft of the pneumatic motor to pass therethrough, the threaded plug having a thread section threadedly engaged with the thread section of the main body, the threaded plug having a driving section, the threaded plug having a large diameter section and a small diameter section, the thread section of the threaded plug being formed on the large diameter section;
   a connecting seat fitted with the threaded plug and having a predetermined length, the connecting seat having a fixing section which includes at least one thread hole in which a bolt is screwed;
   a plurality of first attachments from which one is selected for coupling to the tool hole, the plurality of first attachments including:
      a) a grinding member fitted in the tool hole of the main body, a bottom section of the grinding member being disposed with a sand disk;
      b) a saw disk seat fitted in the tool hole of the main body, a bottom of the saw disk seat having two clamping plates between which a saw disk is sandwiched, the two clamping plates and the saw disk being tightened by a bolt;
      c) an edge-milling tool fitted in the tool hole of the main body, a bottom section of the edge-milling tool having a blade with a predetermined shape; and
      d) a drilling/milling tool fitted in the tool hole of the main body; and,
   a plurality of second attachments from which one is selected for coupling to the connecting seat, the plurality of second attachments including:
      a) a protective cover having two semicircular fitting sections for fitting with the connecting seat, an end of each of the two fitting sections being bolted by a bolt;
      b) an adjustment seat having a fitting section for fitting with the connecting seat, the fitting section of the adjustment seat having a longitudinal slot, the bolt of the connecting seat being passed through the slot to fix the adjustment seat on the connecting seat, the adjustment seat having an engaging section with a larger diameter than the fitting section thereof, a bottom end of the engaging section being an engaging face; and
      c) a stopper board having a fitting section for fitting with the connecting seat, the fitting section of the stopper board having a longitudinal slot, the bolt of the connecting seat being passed through the slot to fix the stopper board on the connecting seat, the stopper board having an annular section, a bottom end of the annular section being an engaging face.

2. A pneumatic tool kit comprising:
   a main body formed with a central hole in which a pneumatic motor is received, a bottom wall of the hole being formed with a thread section, a press lever being pivotally connected to one side of the main body for drivingly controlling the pneumatic motor, a shaft of the pneumatic motor having a predetermined length extending downwardly out of the main body, a bottom section of the shaft being formed with a connecting hole in which a cylindrical chuck is disposed, the cylindrical chuck being formed with a tool hole therein, a fitting member being fitted around the cylindrical chuck;
   a threaded plug formed with an axial through hole for the shaft of the pneumatic motor to pass therethrough, the threaded plug having a thread section threadedly engaged with the thread section of the main body, the threaded plug having a driving section, the driving section of the threaded plug being a radial hole;
   a connecting seat fitted with the threaded plug and having a predetermined length, the connecting seat having a fixing section which includes at least one thread hole in which a bolt is screwed;
   a plurality of first attachments from which one is selected for coupling to the tool hole, the plurality of first attachments including:
      a) a grinding member fitted in the tool hole of the main body, a bottom section of the grinding member being disposed with a sand disk;

b) a saw disk seat fitted in the tool hole of the main body, a bottom of the saw disk seat having two clamping plates between which a saw disk is sandwiched, the two clamping plates and the saw disk being tightened by a bolt;

c) an edge-milling tool fitted in the tool hole of the main body, a bottom section of the edge-milling tool having a blade with a predetermined shape; and d) a drilling/milling tool fitted in the tool hole of the main body; and, a plurality of second attachments from which one is selected for coupling to the connecting seat, the plurality of second attachments including:

a) a protective cover having two semicircular fitting sections for fitting with the connecting seat, an end of each of the two fitting sections being bolted by a bolt;

b) an adjustment seat having a fitting section for fitting with the connecting seat, the fitting section of the adjustment seat having a longitudinal slot, the bolt of the connecting seat being passed through the slot to fix the adjustment seat on the connecting seat, the adjustment seat having an engaging section with a larger diameter than the fitting section thereof, a bottom end of the engaging section being an engaging face; and c) a stopper board having a fitting section for fitting with the connecting seat, the fitting section of the stopper board having a longitudinal slot, the bolt of the connecting seat being passed through the slot to fix the stopper board on the connecting seat, the stopper board having an annular section, a bottom end of the annular section being an engaging face.

\* \* \* \* \*